United States Patent [19]
Steiner

[11] 3,753,769
[45] Aug. 21, 1973

[54] COATING COMPOSITION AND PLASTIC ARTICLES COATED THEREWITH

[75] Inventor: Robert H. Steiner, Rochester, N.Y.

[73] Assignee: Mobil Oil Corporation, New York, N.Y.

[22] Filed: July 2, 1971

[21] Appl. No.: 159,532

Related U.S. Application Data

[63] Continuation-in-part of Ser. No. 561,367, June 29, 1966, abandoned.

[52] U.S. Cl.117/122 H, 117/138.8 E, 117/161 UZ, 260/28.5 R
[51] Int. Cl. ........................... C08j 1/40, C08f 45/52
[58] Field of Search ............... 117/138.8 E, 161 UZ; 260/28.5 R, 29.6 AO, 80.8, 80.81

[56] References Cited
UNITED STATES PATENTS

| | | | |
|---|---|---|---|
| 3,205,077 | 9/1965 | Hammond | 117/138.8 E |
| 3,297,477 | 1/1967 | Barkis et al. | 260/28.5 |
| 3,205,077 | 9/1965 | Hammond | 117/138.8 E |
| 3,248,356 | 4/1956 | Snyder | 260/80.8 |
| 3,297,477 | 1/1967 | Barkis et al. | 260/28.5 |
| 3,318,721 | 5/1967 | Linburg | 117/138.8 E |
| 3,412,059 | 11/1968 | Shakelmeyer et al. | 260/28.5 |

*Primary Examiner*—Morris Liebman
*Assistant Examiner*—S. L. Fox
*Attorney*—Oswald G. Hayes

[57] ABSTRACT

An acrylic based terpolymer coating composition, adapted for use in coating polyolefin films, comprising an interpolymer of (a) from about 2 to about 15 parts by weight of an $\alpha\text{-}\beta$ monoethylenically unsaturated carboxylic acid and (b) from about 85 to about 98 parts by weight of neutral monomer esters comprising an alkyl acrylate ester and an alkyl methacrylate ester.

2 Claims, No Drawings

COATING COMPOSITION AND PLASTIC ARTICLES COATED THEREWITH

CROSS REFERENCES TO RELATED APPLICATIONS

This application is a continuation-in-part of application Ser. No. 561,367, filed June 29, 1966, now abandoned.

BACKGROUND OF THE INVENTION

1. Field of the Invention

The present invention relates to coating compositions adapted for application to film substrate materials such as thermoplastic films, for example polyolefin films such as polyethylene, polypropylene, polybutene, and the like, whereby certain properties of such coated films are improved. Specifically, uncoated polyolefin films such as polypropylene have very high heat sealing temperatures, and an extremely narrow heat seal range, and especially in the case of oriented polypropylene, they exhibit a tendency to disorient and tear when such sealing temperatures are applied to the surface thereof. The coating composition of the present invention when applied to a substrate film such as polypropylene, for example, substantially lowers the minimum heat seal temperature of said film as well as substantially broadening the heat seal range of such a film product. Additionally, the present coating compositions impart increased stiffness or "handle" properties to the film, good hotslip characteristics, and facilitate the formation of peelable heat seals which permit opening of a package overwrapped with the coated film material of this invention without tearing or destroying the wrapper.

2. Description of the Prior Art

Typical heat sealing coatings which have been used in the past and disclosed in the prior art have been materials such as paraffin waxes and the like which are applied to substrates such as paper, for example. However, paraffin wax is susceptible to blocking when a certain amount of pressure is applied and also subject to blocking under relatively warm and humid weather conditions. Attempts have been made to produce coatings for thermoplastic film substrates employing various hydrocarbon resins and mixtures of resins and the like to provide, for example, improved heat seal properties, but in many instances such polymeric coatings have had other deleterious effects on the final coated film product such as resulting in the coated film exhibiting poor blocking characteristics, poor optical properties, poor heat stability and poor aging characteristics. Further, the polymer resin coating compositions of the prior art generally have characteristically low temperature softening points, which additionally contributes to their poor blocking characteristics.

There has been a need for a coating composition which would not only improve the heat seal characteristics of thermoplastic films, but would result in a coated film product having low blocking characteristics, improve or at least have no adverse effects on the optical properties of the film such as gloss and clarity, improve the hotslip (i.e., the ability of the film to slide across a heated surface), and improve the stiffness characteristics of the film thereby allowing ease of handling and processability in automatic packaging equipment.

SUMMARY OF THE INVENTION

In accordance with the present invention, resinous compositions are provided which may be employed in coating polyolefin substrates, such as oriented polypropylene for example, to lower the heat seal temperature thereof while also increasing the heat seal temperature range. The compositions of the present invention contain as a film forming component a resin consisting essentially of an interpolymer of (a) from about 2 to about 15 parts, and preferably from about 2.5 to about 6 parts by weight of an $\alpha$-$\beta$ monoethylenically unsaturated carboxylic acid selected from the group consisting of acrylic acid, methacrylic acid, and mixtures thereof, and (b) from about 85 to about 98 and preferably from about 94 to about 97.5 parts by weight of neutral monomer esters, said neutral monomer esters preferably comprising (1) methyl acrylate or ethyl acrylate and (2) methyl methacrylate. The interpolymer compositions of the present invention are further characterized by preferably comprising from about 30 percent to about 55 percent by weight of methyl methacrylate when said alkyl acrylate is methyl acrylate, and from about 52.5 percent to about 69 percent by weight of methyl methacrylate when said alkyl acrylate is ethyl acrylate.

DESCRIPTION OF SPECIFIC EMBODIMENTS

The coating compositions of the present invention when applied to a suitable substrate film, such as oriented polypropylene for example, give coatings which possess hitherto unavailable properties such as improving the heat seal properties of the film while simultaneously improving the blocking characteristics, hotslip properties, stiffness, and optical properties of the final coated film product.

The coating resins of the present invention when applied to the surface of a film substrate exhibit relatively high temperature softening points, i.e., on the order of about 170° F. and above. Accordingly, when the coated films for example in roll form are stored over prolonged periods of time it has been found that under normal film storage conditions the overlying film layers exhibit little or no tendency to block due to softening of the coating. This has been a particularly troublesome problem with many prior art resinous coatings for thermoplastic films and has now been eliminated by employment of the novel compositions of the present invention.

The present invention embodies a thermoplastic article, and particularly a polyolefin film such as polyethylene or polypropylene substrate, which is coated on at least one surface thereof with a thin heat sealable polymer film. The film is preferably initially pretreated to promote good adhesion of the applied polymeric coating. The treated film is then coated on at least one side with a terpolymer composition, preferably together with one or more other materials and including a finely divided inorganic material.

In order for a coating resin to meet necessary commercial requirements such as for example being heat sealable at as low a temperature as possible while exhibiting non-blocking characteristics at storage conditions which may be as high as 110° F., it has been found that the glass transition temperature (Tg) of the resin coating should be in the range of from about 100° to about 140° F. The Tg may be defined as the temperature at which a polymer changes from a glassy, brittle solid to a very high viscosity liquid [Bueche, "Physical Properties of Polymers," Interscience Publishers, 1962]. At temperatures below or for that matter even slightly above the Tg, polymers exhibit such great resistance to viscous flow that sealing does not take place, irregardless of applied pressures or how long the polymer surfaces are left in contact with each other.

Another requirement of a coating resin which is to be applied by "wet" techniques, as contrasted to hot melt techniques, is that it be soluble or dispersible in volatile solvents to give low viscosity, high solids content solutions or dispersions. For obvious commercial reasons, the solvent should be readily available and inexpensive, with water representing the ultimate goal. Many coatings are applied as dispersions of polymers in water, commonly called latices. However, the application of coatings from the latex form has several disadvantages. First, even the finest latex particles are massive in comparison to the ultimate molecular size, containing many millions of resin molecules. This prevents the intimate blending of compounding ingredients which may be desired in order to achieve certain properties. Second, most latices contain very large amounts of surface active agents in order to maintain particle dispersion. Those surfactants can be detrimental to the desired properties of the coating material such as adhesion, optical clarity, etc. On the other hand, truly water soluble polymers such as polyvinyl alcohol are not desirable as coatings because of their tendency to absorb moisture from the air at conditions of high relative humidity and become sticky. It is known that polymers containing pendant carboxylic acid groupings are soluble in water containing sufficient amounts of a base such as ammonia to neutralize the acid. The amount of acid required in a polymer for ammonia water solubility is dependent upon the nature of the other monomer units, but generally is in the range of from about 2 to about 15 percent by weight. A coating of a resin of this type applied from ammonia water solution becomes water insoluble on drying because of the volatilization of the solubilizing ammonia.

Finally, a heat sealable coating resin should have a sufficiently low molecular weight in order to exhibit sufficient viscous flow at temperatures moderately above the Tg to give a good seal. Also, low molecular weight is desirable to result in ammonia water solutions of low viscosity.

In accordance with one aspect of the present invention, it has been found that the aforediscussed desirable properties of a heat sealable coating resin may be achieved by controlled synthesis of the multipolymers of the present invention.

The novel multipolymers possessing the desired properties of Tg, acid content, and molecular weight may be produced in accord with the present invention by the proper selection and interpolymerization of the following types of compounds, in the presence of a suitable chain transfer agent such as for example mercaptans or halogenated hydrocarbons:

A. A high Tg monomer;
B. A low Tg monomer; and
C. Acid containing monomers.

Examples of high Tg monomers which may be employed include ethyl methacrylate, methyl methacrylate and others.

Examples of low Tg monomers which may be employed include, for example, lower alkyl acrylates such as methyl, ethyl or butyl acrylates.

Examples of acid monomers which may be employed include, for example, acrylic acid, methacrylic acid, maleic acid, crotonic acid and mixtures thereof.

The polymerization reaction may be advantageously carried out by adding the mixed monomers incrementally during the reaction in order to attain a more nearly homogeneous distribution of monomers in the multipolymer molecules.

The relative proportions of monomers which may be employed to produce the novel multipolymer coating compositions of the present invention may vary and include between about 2 percent and about 15 percent, and preferably from about 2 ½ percent to about 6 percent of an $\alpha$-$\beta$ unsaturated carboxylic acid or mixtures thereof, and from about 85 percent to about 98 percent, and preferably from about 94 percent to about 97.5 percent by weight of the neutral ester monomers, said monomers having been interpolymerized utilizing known polymerization techniques, such as, for example, emulsion polymerization.

Thus, the present invention embodies, for example, terpolymers that may be prepared by terpolymerizing ethylenically unsaturated monomers including between 2 percent and 15 percent by weight, and preferably from about 2 ½ percent to about 6 percent by weight, of an $\alpha$-$\beta$ unsaturated carboxylic acid and preferably acrylic or methacrylic acid and mixtures thereof; 85 percent to 98 percent, and preferably 94 percent to 97.5 percent, by weight of neutral monomer esters comprising (a) an alkyl acrylate ester such as methyl, ethyl or butyl acrylate and (b) alkyl methacrylate esters such as methyl-methacrylate or ethyl methacrylate, for example. The monomer components are employed in a ratio such that the alkyl methacrylate monomer is present in an amount of at least 10 percent by weight of the total terpolymer compositon and preferably from about 20 to about 80 percent by weight, and the alkyl acrylate monomer component in amounts of at least 10 percent by weight of the total coating composition, and preferably from about 80 to about 20 percent by weight.

In general, the uncoated substrate films employed in the practice of the present invention are usually from 0.2 to up to 5 mils in thickness and preferably from about 0.5 to 1.5 mils.

Before applying the coating composition to the appropriate substrate, the surface of the substrate film is treated to insure that the coating will be strongly adherent to the film thereby eliminating the possibility of the coating peeling or being stripped from the film. This treatment may be accomplished by employing known prior art techniques such as, for example, film chlorination, i.e., exposure of the film to gaseous chlorine, treatment with oxidizing agents such as chromic acid, hot air or steam treatment, flame treatment and the like. Although any of these techniques may be effectively employed to pretreat the film surface, a particularly desirable method of treatment has been found to be the so called electronic treatment method which comprises exposing the film surface to a high voltage corona discharge while passing the film between a pair of spaced electrodes. After electronic treatment of the substrate film surface it may be coated with the coating composition of the present invention which coating will then exhibit a tendency to more strongly adhere to the treated film surface.

In applications where even greater coating-to-film adherence is desired, i.e. greater than that resulting from treatment of the film surface by any of the aforediscussed methods, an intermediate primer coating may be employed to increase the adherence of the coating composition of the present invention to the substrate film. In that case the film is first treated by one of the foregoing methods, electronic treatment being a preferred method, to provide increased active adhesive sites thereon (thereby promoting primer adhesion) and to the thus treated film surface there is subsequently applied a continuous coating of a primer material. Such primer materials are well known in the prior art and for example include titanates and poly(ethylene imine). A particularly effective primer coating for purposes of the present invention has been found to be poly(ethylene imine). The imine primer provides an overall adhesively active surface for thorough and secure bonding with the subsequently applied coating composition of this invention. The primer is applied to the electronically treated base film by conventional solution coating means such as mating roller application for example. It has been found that an effective coating solution concentration of the poly(ethylene imine) applied from either aqueous or organic solvent media such as ethanol, for example, is a solution comprising about 0.5 percent by weight of the poly(ethylene imine).

It is possible to add the coating compositions of the present invention onto the surface of the treated film substrate from a non-aqueous solution of the composition using, for example, various organic solvents such as alcohols, ketones, esters, etc. However, since the coating compositions of the present invention may, as stated hereinafter, contain colloidal inorganic materials and since such materials are difficult to keep well dispersed in organic solvents, it is preferable that the coating compositions of the present invention be applied from aqueous media and preferably from an alkaline aqueous solution thereof.

The solution of terpolymer, preferably in an alkaline aqueous solution such as an ammoniacal solution, is applied to the treated surface of a film material in any convenient and known manner, such as by gravure coating, roll coating, dipping, spraying etc. The excess aqueous solution may be removed by squeeze rolls, doctor knives, etc. The coating composition should be applied in such amount that there will be deposited upon drying, a smooth evenly distributed layer of from 0.02 to 0.04 mil thickness which, expressed otherwise, is equivalent to about 0.4 to 0.8 grams per 1,000 sq. in. of film when both sides of the film are being coated. In general, the thickness of applied coating is such that it is sufficient to impart the desired heat sealability and stiffness characteristics to the base film structure.

The coating on the film, as exemplified by use of an ammoniacal solution of the terpolymer, is subsequently dried by hot air, radiant heat or by any other convenient means. Upon drying, ammonia is evolved leaving a non-water soluble, clear, adherent, glossy coated film useful, for example, as a packaging film.

It is also an embodiment in the practice of this invention to incorporate a suitable component to the coating composition to impart "hot slip," that is, satisfactory slip properties when the wrapping material or partially wrapped package passes in contact with the heat sealing portions of wrapping apparatus such as heated platens, etc. It is usually defined quantitatively as the coefficient of friction at the temperature and pressure used.

In order to produce a coated wrapping material having the above characteristics there is applied to the film a composition made up of the terpolymer component as hereinbefore described as the film forming and heat sealing agent together with a solid, finely divided, water insoluble, inorganic material such as colloidal silica, to function as a hot slip agent. Other finely divided inorganic materials which can be used to enhance hot slip properties include such water insoluble solids as diatomaceous earth, calcium silicate, bentonite, and finely divided clays. In order to function most efficiently, it is desirable that this finely divided inorganic material have a particle size between 10 and 200 millimicrons, an alkali stabilized silica dispersion being the preferred material for use.

While the amounts of each material required for producing the optimum hot slip properties may vary depending on the specific material used, the coating compositions, and other variables of composition and process, it is preferred to use from 30 to 60 percent by weight (based on the terpolymer) of the slip agent and preferably from about 35 percent to about 45 percent by weight.

"Blocking" is the tendency of film to adhere to itself when two or more surfaces of the film are held pressed together, for example when sheets or mill rolls of the film are stacked in storage. It is more pronounced at elevated temperatures and high relative humidities. Under normal storage conditions, the maximum temperatures encountered will be between 100° and 110° F. and the relative humidity may run as high as 90–100 percent. It is desirable that under these conditions the coated film will not stick to tiself, itself, in other words, that it be resistant to blocking. Otherwise, when the film is stored in rolled form on cores, for example, the layers will stick together and the film cannot readily be unwound for use.

Anti-blocking materials which may be used include finely divided waxes and wax-like materials which melt at temperatures above the maximum temperatures encountered in the storage of the film and are not soluble in the terpolymer at these temperatures. Specific examples are natural waxes such as paraffin wax, microcrystalline wax, beeswax, carnauba wax, japan wax, montan wax, etc., and synthetic waxes such as hydrogenated castor oil, chlorinated hydrocarbon waxes, long chain fatty acid amides, etc.

In addition to functioning as anti-blocking materials the above-described wax materials when incorporated into the coating compositions of the present invention also function to improve the "cold-slip" properties of the films coated therewith, i.e., the ability of a film to satisfactorily slide across surfaces at about room temperatures.

A particular type of thermoplastic film which can be advantageously coated with the coating compositions of this invention is molecularly oriented, isotactic polypropylene. After extrusion of the base polypropylene film utilizing conventional extrusion techniques the film is heated and molecularly oriented by stretching it in both a longitudinal and transverse direction. The resultant oriented film exhibits greatly improved tensile and stiffness properties. However, it is difficult to heat seal by conventional techniques because at the requisite sealing temperature, i.e., on the order of about 350° F., film disorientation and shrinkage occur which results in the film rupturing and tearing apart. However, when such oriented films are subjected to surface treatment methods as hereinbefore described and subsequently coated with the present novel coating compositions they can then be sealed at temperatures sufficiently low to prevent shrinkage of the substrate, i.e., the oriented polypropylene film.

As hereinbefore noted standard polymerization techniques may be employed to produce the terpolymer coating compositions of the present invention such as for example solution, bulk or emulsion polymerization. However, the preferred polymerization technique for purposes of the present invention and as set forth in the following Example is an emulsion polymerization system.

EXAMPLE I

A reaction vessel was charged with 1.2 liters of water containing 3.0 grams of a commercially available emulsifier identified as Gafac RE-610, a mixture of phosphoric acid esters; and 1.8 grams of ammonium persulfate as a polymerization catalyst. The reaction vessel was then heated to a temperature of approximately 80° C. with stirring. The following materials were mixed and added incrementally with stirring over a period of 3 hours:

a. 216 grams of methyl methacrylate
b. 366 grams of methyl acrylate
c. 18 grams of methacrylic acid and
d. 2.2 grams of ethyl mercaptoacetate as a molecular weight regulator.

Following completion of the monomer addition the reaction vessel was maintained at the reaction temperature of 80° C. for an additional 30 minutes. Upon termination of the reaction the product contained in the reaction consisted of a latex comprising 33 percent solids, i.e., 1 part terpolymer resin to two parts water. While still at a temperature of 80° C. the latex reaction product was diluted with 1.2 liters of water containing dissolved therein 21.2 grams of ammonia. The mixture was stirred for 1 hour at 60° to 70° C. and then allowed to cool to room temperature. The product was an ammoniacal aqueous solution of a methyl methacrylate/methyl acrylate/methacrylic acid terpolymer with a viscosity of 20 cps (at 25° C.) and containing 20 percent terpolymer resin and 600 percent of the theoretical amount of ammonia required to neutralize the acid groups of the terpolymer. The dried polymer had an intrinsic viscosity of 0.28 and an acid number of 20.

To the ammoniacal aqueous solution of terpolymer was added (a) 40 parts (per 100 parts of terpolymer resin) of an aqueous dispersion (30 percent solids) of an alkaline stabilized colloidal silica, identified by the trade-name Syton; and (b) 10 parts (per 100 parts of terpolymer resin) of an aqueous dispersion (11 percent solids) of Carnauba wax, resulting in a dispersion of wax and silica in the aqueous ammoniacal solution of the terpolymer composition.

EXAMPLE II

The procedure and conditions employed for the interpolymerization and coating preparation used in Example I were followed with the exception that the monomer charge comprised the following monomer components:
Methyl methacrylate - 330 grams
Ethyl acrylate - 252 grams
Methacrylic acid - 18 grams

EXAMPLE III

The procedure and conditions employed for the interpolymerization and coating preparation used in Example I were followed with the exception that the monomer charge comprised the following monomer components:
Methyl methacrylate - 396 grams
Butyl acrylate - 186 grams
Methacrylic acid - 18 grams

EXAMPLE IV

The procedure and conditions employed for the interpolymerization and coating preparation used in Example I were followed with the exception that the monomer charge comprised the following monomer components:
Methyl methacrylate - 177 grams
Methyl acrylate - 64.5 grams
Methacrylic acid - 24 grams
Acrylic acid - 12 grams Each of the coating solutions prepared in accordance with the foregoing examples were coated onto the surface of biaxially oriented polypropylene film samples approximately 0.7 mils thick. The film was produced from polypropylene resin identified as Eastman Tenite 423DF, a non-slip polypropylene having a high isotactic content and a melt index of 4.5. The film, after extrusion, was biaxially oriented utilizing techniques hereinbefore discussed. The coatings were applied utilizing standard gravure coating apparatus and techniques. Before coating, the film had been treated as aforedescribed by subjecting both surfaces thereof to electronic treatment and priming the electronically treated surfaces with a polyethylene imine solution consiting of 0.5 percent by weight of poly(ethylene imine) dissolved in a mixture of 85 percent water and 15 percent ethanol. The total coating weight on the oriented, treated, primed film surface after drying the film was approximately 0.6 grams/1,000 in.$^2$ of film, both sides of the film having been coated.

The coated films were subsequently subjected to a variety of tests, the results of which are reflected by the data contained in the following table. For comparison purposes a sample of uncoated oriented polypropylene film was subjected to the same testing procedure and the results thereof are also reported in Table 1.

TABLE I

| | Uncoated balanced oriented polypropylene film | Coated balanced oriented polypropylene film | | | |
|---|---|---|---|---|---|
| | | Example I coating | Example II coating | Example III coating | Example IV coating |
| Gage, mils | 0.83 | 0.90 | 0.88 | 0.91 | 0.86. |
| Tensile strength, lbs./sq. in | 26,000 | 25,000 | 25,500 | 24,000 | 27,000. |
| Tensile impact strength, ft.-lb./cu. in | 1,400 | 1,200 | 1,300 | 1,400 | 1,300. |
| Elongation at break, percent | 70 | 70 | 65 | 60 | 65. |
| Tensile modulus, lbs./sq. in | 415,000 | 450,000 | 430,000 | 420,000 | 430,000. |
| Coefficient of friction | 0.50 | 0.20 | 0.23 | 0.25 | 0.20. |
| Gloss, Gardner (45° angle) | 90 | 88 | 86 | 89 | 88. |
| Haze, Gardner, percent | 1 | 1 | 2 | 1 | 1. |
| Minimum heat seal temperature, °F.* | 345 | 210 | 208 | 205 | 212. |
| Heat seal strength**, grams/inch | 0 | 150 | 170 | 190 | 140. |
| Heat seal range, °F | 10 | 70 | 70 | 70 | 70. |
| Blocking resistance | Good | Excellent | Good | Fair | Good. |
| Hot slip | Extremely poor | do | do | Good | Fair. |

\* Temperature at which a 75 g./inch seal is obtained at 2 seconds dwell time; 100 g./sq. in. pressure.
\*\* Sealed at 230° F.; 2 seconds; 100 g./in.² pressure.

Thus, as apparent from the data contained in the foregoing table, the oriented polypropylene film sample coated with the polymer coating composition of the present invention exhibits excellent seal strength, 75 grams/inch being satisfactory for most commercial applications at relatively low temperatures whereas the uncoated sample failed to seal at such temperatures.

The blocking resistance of the coated film at 100° F. and 90 percent relative humidity was excellent. The coated film also exhibited excellent hot slip properties at the sealing element surface temperatures normally encountered in commercial wrapping equipment.

The cold slip properties of the coated film are improved as reflected by the lowered coefficient of friction indicated in Table 1.

An additional advantage derived from the employment of the present novel coatings is the increased seal range obtained, i.e., range of temperature over which satisfactory seals may be made without burning through or otherwise destroying the film. For example, the coated film sample prepared with the coating produced in accord with Example 1 exhibited satisfactory heat sealing at temperatures as low as 210° F. and were sealable at temperatures as high as 280° F. and higher without burn through of the substrate film occurring. Conversely, a similar sample of oriented polypropylene film without the present coating could only be sealed at temperatures on the order of 350° F. ± 5° F. Below this temperature range, no seal occurred and above it the film ruptured and tore.

It has been found in accordance with the present invention that the portion of monomer components in the present composition in order to achieve a satisfactory coating for application to polyolefin film substrates must be maintained with certain specific limits. In the following Tables II, IV, and V, a series of terpolymers were prepared with varying monomer concentrations and applied from a coating solution onto the surface of a biaxially oriented polypropylene film substrate.

In Table 1 a series of terpolymers of methyl methacrylate, methyl acrylate and methacrylic acid was prepared in which the Tg was varied from 55° to 150° F. by varying the ratio of MMA (methyl methacrylate) and MA (methyl acrylate). The Tg's were calculated by a well-known mathematical procedure. (See, for example, T. E. Nielsen, "Mechanical Properties of Polymers," Reinhold Publishing Co., 1962, pp. 22–27.) Sufficient chain transfer agent was incorporated in each polymerization recipe so that the resultant polymers had intrinsic viscosities in the range of 0.20 to 0.30. An MAA (methacrylic acid) content of 3.25 percent was used in each case. The terpolymers were solubilized by adding an amount of ammonia equal to two times the amount required to neutralize the polymeric acid content and sufficient water to produce a 22 percent solids solution. The pH of these solutions was about 10 to 10.5. A coating solution was prepared from each resin solution by adding an aqueous dispersion of carnauba wax having an average particle size of 70 millimicrons and 40 parts (dry weight) of a colloidal silica dispersion having an average particle size of 20 millimicrons per 100 parts (dry weight) of resin. The mixture was applied to one side of an oriented polypropylene film having an average thickness of 0.75 mils by a standard gravure roll coating technique, the film having been previously subjected to a standard pretreatment to improve coating adhesion, namely a corona discharge treatment followed by coating with a very thin primer coat of polymerized ethylene imine. The wet coating was dried in a hot air oven at a temperature of about 95° C. An average dry coating weight of about 0.6 gram/1,000 square inches of film was applied. The films thus obtained were tested for blocking, low pressure heat seal strength, and film-to-film sliding coefficient of friction. Practical experience has shown commercially useful film should have a blocking value of not more than 5 grams/inch, low pressure heat seal strengths of at least 100 grams/inch at 230° F. sealing temperature and at least 150 grams/inch at 250° F., and a coefficient of friction of less than 0.35. A study of the test data presented in Table I reveals that coatings based on terpolymers with a Tg of less than about 100° F. are unsatisfactory in regard to at least one of these criteria, even when a relatively large amount (12 phr.) of wax is added. On the other hand, coatings based on terpolymers having a Tg greater than about 140° F. are unsatisfactory even at reduced wax levels.

Similar terpolymers may be produced using ethyl acrylate as the low Tg monomer rather than the methyl ester. Table III shows the Tg values of terpolymers containing ethyl acrylate as the alkyl acrylate monomer component of the terpolymer composition.

TABLE II

| Ex. No. | Polymer composition,[1] percent | | | Tg calc., °F. | Coating formulation [2] | | Film properties | | | | |
|---|---|---|---|---|---|---|---|---|---|---|---|
| | MMA | MA | MAA | | Wax | SiO2 | Blocking,[3] g./in. | Heat seal,[4] g./in. | | C.O.F.[5] cold slip | Hot slip [6] |
| | | | | | | | | 230° F. | 250° F. | | |
| 1 | 0 | 96.75 | 3.25 | 55 | 12 | 40 | 12 | 3 | 23 | | 5 |
| 2 | 13.5 | 83.25 | 3.25 | 75 | 12 | 40 | 7 | 70 | 220 | 0.40 | 5 |
| 3 | 27 | 69.75 | 3.25 | 95 | 12 | 40 | 6.2 | 160 | 250 | 0.35 | 4 |
| 4 | 32.75 | 64 | 3.25 | 103 | 12 | 40 | 4.2 | 210 | 320 | 0.33 | 2 |
| 5 | 39 | 57.75 | 3.25 | 112 | 12 | 40 | 0.4 | 110 | 180 | 0.20 | 1 |
| 6 | 39 | 57.75 | 3.25 | 112 | 8 | 40 | 1.0 | 170 | 240 | 0.23 | 1 |
| 7 | 43.75 | 53 | 3.25 | 120 | 8 | 40 | 0 | 150 | 210 | 0.25 | 1 |
| 8 | 48 | 48.75 | 3.25 | 130 | 8 | 40 | 0 | 80 | 200 | 0.17 | 1 |
| 9 | 48 | 48.75 | 3.25 | 130 | 6 | 40 | 0.2 | 120 | 250 | 0.29 | 1 |
| 10 | 54.75 | 42 | 3.25 | 140 | 8 | 40 | 0 | 40 | 180 | 0.27 | 1 |
| 11 | 54.75 | 42 | 3.25 | 140 | 6 | 40 | 0 | 100 | 210 | 0.33 | 1 |
| 12 | 61 | 35.75 | 3.25 | 150 | 8 | 40 | 0 | 15 | 90 | 0.32 | 1 |
| 13 | 61 | 35.75 | 3.25 | 150 | 6 | 40 | 0 | 70 | 140 | 0.38 | 1 |

[1] All polymers had intrinsic viscosities in range of 0.24–0.28.
[2] Carnauba wax dispersion, parts per 100 parts resin (dry basis). Carnauba silica dispersion, parts per 100 parts resin (dry basis).
[3] Peel strength of film stores (coating in contact with coating) at 100° F. 90% relative humidity, 1 lb./in.[2] pressure, 24 hours.
[4] Peel strength of film sealed under 100 gms./in.[2] pressure, 2 seconds time, heat from one side only.
[5] Film to film coefficient of friction.
[6] Hot slip rated quantitatively at 270° F.: 1=excellent; 2=good; 3=fair; 4=poor; 5=very poor.

TABLE III

| MMA | EA | MAA | Tg Calculated |
|---|---|---|---|
| 50 % | 46.75% | 3.25% | 95°F. |
| 52.5 | 44.25 | 3.25 | 100°F. |
| 54 | 42.75 | 3.25 | 103°F. |
| 57.5 | 39.25 | 3.25 | 112°F. |
| 60.7 | 35.75 | 3.25 | 120°F. |
| 64.6 | 32.15 | 3.25 | 130°F. |
| 69.2 | 27.55 | 3.25 | 104°F. |
| 73.0 | 23.75 | 3.25 | 150°F. | colloidal silica (dry basis) and coated on oriented polypropylene film as described in a previous paragraph. The test data presented in Table IV indicate that at least about 2.5 percent MAA is required to produce a terpolymer with a high degree of ammonia solubility and a desirable balance of film properties. When the MAA content is higher than about 6 percent, heat seal strengths at low temperatures (230° F) are lower than desired.

TABLE IV

| Ex. No. | Composition, percent | | | Solution properties | | Film properties | | Heat seals,[4] g. | | |
|---|---|---|---|---|---|---|---|---|---|---|
| | MMA | MA | MAA | Clarity | Viscosity,[1] cps. | Hot slip [2] | Blocking,[3] gm./in. | 230° F. | 250° F. | C.O.F. |
| 14 | 42.5 | 57.5 | 0 | Milky | 3 | 4 | 2.1 | 80 | 100 | 0.38 |
| 15 | 41 | 57.5 | 1.5 | do | 5.5 | 4 | 1.2 | 140 | 190 | 0.35 |
| 16 | 40.5 | 57.5 | 2.0 | Very hazy | 12.5 | 3 | 1.8 | 210 | 220 | 0.34 |
| 17 | 40.0 | 57.5 | 2.5 | Hazy | 18 | 2 | 2.9 | 270 | 270 | 0.38 |
| 18 | 39.5 | 57.5 | 3.0 | Slight haze | 20 | 1 | 0.7 | 190 | 250 | 0.28 |
| 19 | 39 | 57.75 | 3.25 | Very slight haze | 22 | 1 | 0.4 | 170 | 220 | 0.24 |
| 20 | 38.25 | 57.75 | 4.0 | Clear | 25 | 1 | 0.3 | 140 | 180 | 0.24 |
| 21 | 37 | 58 | 5.0 | do | 35 | 1 | 0 | 130 | 190 | 0.25 |
| 22 | 35 | 59 | 6.0 | do | 55 | 2 | 1.7 | 110 | 180 | 0.24 |

[1] Brookfield viscosity of 22% solids solution.
[2] Hot slip ratings at 270° F.: 1=excellent; 2=good; 3=fair; 4=poor; 5=very poor.
[3] Peel strength of film stored 24 hours at 100° F., 90% relative humidity under 1 lb./in.[2] pressure.
[4] Peel strength of films sealed under 100 gms./in.[2] pressure, 2 seconds, heated from one side only.

To illustrate the importance of the acid monomer content of the terpolymers described in this invention, a series of co- and terpolymers of MMA, MA and from 0 to 6 percent MAA was prepared. The ratios of the ester monomers were adjusted so that all the polymers had calculated Tg's of about 112° F. Sufficient chain transfer agent was used to regulate the intrinsic viscosity of each polymer to the range of 0.24–0.28. The terpolymers were tested for ammonia-water solubility by stirring the latexes with water and ammonia at 80° C. for one hour to produce a dispersion or solution containing 22 percent solids and 200 percent of the amount of ammonia required to neutralize the acidic monomer. (In the first example which contained no acid monomer, sufficient ammonia was added to adjust the pH to the range of 10–10.5.) Solubility of the polymers was determined by visual examination of the haziness of the cooled solutions and measurement of the viscosity after 24 hours standing at room temperature. The terpolymer solutions were compounded with 8 phr. carnauba wax dispersion (dry basis) and 40 phr.

The importance of low molecular weight of the terpolymers described in this invention was illustrated by preparing a series of polymers containing 3.25 percent MAA, 39 percent MMA and 57.75 percent MA (Tg = 112° F.) in which the intrinsic viscosity was varied from 2.00 to 0.17 by varying the amount of chain transfer agent (ethyl mercaptoacetate-EMA) employed during the emulison polymerization step used to produce the terpolymer compositions.

The terpolymers were solubilized in ammonia water to form 22 percent solids solutions with 200 percent of the amount of ammonia required to neutralize the acid monomer, compounded with 8 phr. carnauba wax and 40 phr. silica, and coated on oriented polypropylene film as described in preceding paragraphs. The data on the solutions and coated films are presented in Table V. It may be noted that the highest molecular weight resins (Examples 23 and 24) gave very high viscosity ammonia water solutions and could be coated only with great difficulty and with special techniques.

TABLE V

| Ex. No. | EMA,[1] percent | Intrinsic viscosity[2] | Solution viscosity, cps. | | Blocking, g./in. | Heat seals, g./in. | | C.O.F. |
|---|---|---|---|---|---|---|---|---|
| | | | 22% | 17% | | 230° F. | 250° F. | |
| 23 | 0 | 2.00 | >100,000 | 12,000 | 1.2 | 100 | 120 | 0.35 |
| 24 | 0.11 | 0.82 | 1,700 | 200 | 2.3 | 130 | 180 | 0.32 |
| 25 | 0.22 | 0.38 | 210 | | 0.9 | 150 | 200 | 0.29 |
| 26 | 0.37 | 0.27 | 22 | | 0 | 170 | 220 | 0.26 |
| 27 | 0.55 | 0.21 | 18 | | 0.3 | 125 | 170 | 0.26 |
| 28 | 0.73 | 0.17 | 17 | | 0 | 100 | 150 | 0.28 |

[1] Ethyl mercaptoacetate chain transfer agent; percent of monomer.
[2] Determined in dilute acetone solution.
[3] Brookfield viscosity of aqueous solution containing 200% of the amount of ammonia required to neutralize the acid monomer.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

I claim:

1. A polyolefin film substrate having a surface coating of a heat sealable composition consisting of an interpolymer as the film forming agent of (a) from about 2.5 to about 6 parts by weight of an α - β monoethylenically unsaturated carboxylic acid selected from the group consisting of acrylic acid, methacrylic acid, and mixtures thereof, and (b) from about 97.5 to about 94 parts by weight of neutral monomer esters, said neutral monomer esters comprising (1) methyl acrylate or ethyl acrylate and (2) methyl methacrylate, said interpolymer comprising from about 30 percent to about 55 percent by weight of methyl methacrylate when said alkyl acrylate is methyl acrylate, and from about 52.5 percent to about 69 percent by weight of methyl methacrylate when said alkyl acrylate is ethyl acrylate; said interpolymer coating being further characterized as containing (1) from about 30 percent to about 60 percent by weight based upon the total weight of said interpolymer, of a hot slip agent consisting of a finely-divided, water-insoluble, inorganic solid selected from the group consisting of silica, diatomaceous earth, calcium silicate, bentonite and finely-divided clays, said inorganic solid having a particle size between about 10 and about 200 millimicrons, and (2) said interpolymer coating being further characterized by containing a cold-slip, anti-blocking material comprising finely-divided wax.

2. A polyolefin film in accordance with claim 1 wherein said polyolefin is polypropylene and said inorganic solid is silica.

\* \* \* \* \*

UNITED STATES PATENT AND TRADEMARK OFFICE
CERTIFICATE OF CORRECTION

PATENT NO. : 3,753,769
DATED : August 21, 1973
INVENTOR(S) : ROBERT H. STEINER

It is certified that error appears in the above-identified patent and that said Letters Patent are hereby corrected as shown below:

Cover page, Item [63]
"Continuation-in-part of Serial No. 561,367, June 29, 1966, abandoned" should be -- Continuation of Ser. No. 881,626, December 2, 1969 now abandoned, which is a continuation-in-part of Ser. No. 561,367, filed June 29, 1966, now abandoned --.

Col. 1, lines 6, 7 & 8
"This application is a continuation-in-part of application Ser. No. 561,367 filed June 29, 1966, now abandoned." should be -- This application is a streamline continuation of Ser. No. 881,626, December 2, 1969 now abandoned, which is a continuation-in-part of Ser. No. 561,367, filed June 29, 1966, now abandoned --.

Signed and Sealed this seventh Day of October 1975

[SEAL]

Attest:

RUTH C. MASON
Attesting Officer

C. MARSHALL DANN
Commissioner of Patents and Trademarks